(12) United States Patent
Huff et al.

(10) Patent No.: US 7,099,475 B2
(45) Date of Patent: Aug. 29, 2006

(54) SYSTEM AND METHOD FOR PASSWORD AUTHENTICATION FOR NON-LDAP REGIONS

(75) Inventors: Barbara Huff, Arvada, CO (US); Howard Pfeffer, Lexington, MA (US); Michael Gazillo, Norwalk, CT (US); Jack Cashman, Ashburn, VA (US)

(73) Assignee: Road Runner Holdco LLC, Herndon, VA (US)

( * ) Notice: Subject to any disclaimer, the term of this patent is extended or adjusted under 35 U.S.C. 154(b) by 381 days.

(21) Appl. No.: 09/731,571

(22) Filed: Dec. 7, 2000
(Under 37 CFR 1.47)

(65) Prior Publication Data

US 2003/0131264 A1    Jul. 10, 2003

(51) Int. Cl.
*H04M 1/66* (2006.01)
(52) U.S. Cl. .......................... 380/270; 726/3; 709/229
(58) Field of Classification Search ................ 370/329, 370/401, 464; 310/25, 329; 705/18; 709/225, 709/229; 713/201, 200, 202, 168; 380/270; 726/3
See application file for complete search history.

(56) References Cited

U.S. PATENT DOCUMENTS

| | | | |
|---|---|---|---|
| 5,881,234 A | | 3/1999 | Schwob |
| 5,898,780 A | * | 4/1999 | Liu et al. ..................... 713/155 |
| 6,009,103 A | | 12/1999 | Woundy |
| 6,073,242 A | | 6/2000 | Hardy et al. |
| 6,151,628 A | * | 11/2000 | Xu et al. ..................... 709/225 |
| 6,539,482 B1 | * | 3/2003 | Blanco et al. .............. 713/201 |
| 6,738,362 B1 | * | 5/2004 | Xu et al. ..................... 370/329 |

OTHER PUBLICATIONS

C. Perkins, Request for Comments: 2002, Oct. 1996, Network Working Group.*
Henning Maass, Open mobility management platform with directory-based architecture and Signalling Protocols Apr. 2-3, 1998.*
Park, A.S.-B; Emmerich, M; Swertz, D.; Service trading for mobile agents with LDAP as a service directory.*

* cited by examiner

*Primary Examiner*—Jacques H. Louis-Jacques
*Assistant Examiner*—Ellen C Tran
(74) *Attorney, Agent, or Firm*—Roberts Mardula & Wertheim, LLC

(57) ABSTRACT

A system and method for allowing roaming of a subscriber and password authentication a non-LDAP region. A user signs onto a network access server which in turn connects to the regional LDAP RADIUS server. Password authentication occurs by hashing a transmitted password and comparing it to a clear text password from an LDAP database that has been hashed in the same manner as the transmitted password. When the subscriber is in a non-LDAP region, The password proceeds trough a proxy server to a regional RADIUS server which connects to a non-LDAP server. The non-LDAP server connects to and SMS database and retrieve the clear text password associated with the non-LDFSAP user, hashes it according the same method as the transmitted hashed password and formats the password for comparison in the regional RADIUS server. If the hashed passwords compare, the access is permitted.

19 Claims, 1 Drawing Sheet

SYSTEM AND METHOD FOR PASSWORD AUTHENTICATION FOR NON-LDAP REGIONS

FIELD OF THE INVENTION

This invention relates generally to connection to the Internet for computers that are not within their original ISP region. More particularly, the present invention is a system and method for a dial-up roaming architecture that allows Internet connections for individuals who are not within their original ISP region.

BACKGROUND OF THE INVENTION

Internet connection is typically accomplished by an Internet Service Provider (ISP) signing up an individual who can then sign on to the Internet via connectivity that is provided by the ISP. This typically takes the form of a dial-up modem or other type of Internet connection via the ISP. In the case of a cable internet infrastructure, the connection is via a cable modem. In the case of a digital subscriber line (DSL) internet infrastructure, the connection is via a DSL modem. Thereafter, the user can access the Internet based upon the speed of the connection to the ISP.

A problem occurs when an individual user is no longer present within the region that is covered by the cable or DSL ISP. This occurs when individuals are traveling or "roaming" to an area other than the area where service is provided by the user's ISP.

When using a cellular telephone, this procedure is very commonly encountered by travelers who go from one geographic region to another. Basically travelers are then assigned to a roaming status and their presence within a particular calling area is noted with information subsequently provided to the home network, allowing home network to contact the user who is "roaming."

To solve this problem, currently many users keep a dial-up ISP such as the Microsoft Network to allow them to have access to the Internet when they are away from home. This avoids some of the issues associated with different formats that support dial-up roaming but does not allow, for example, access to the features of a cable internet connection.

Currently, one such protocol that can be used as a directory service to allow people to locate other people on the Internet is called the Lightweight Directory Access Protocol or LDAP. LDAP is a directory service specification that is generally accepted in the Internet. Such a directory service allows people to locate other people or services. Such a directory service is basically a database that can be searched and manipulated in a number of ways to display information about a network and its resources. One such use is to create and manage user accounts including access by registered users to LDAP enabled networks.

Although LDAP service is widely accepted over the Internet, there are many Internet Service Providers who are not LDAP compatible or enabled. These non-LDAP networks may be affiliated with other networks which are LDAP enabled. In such cases it is difficult to verify that a user is authorized to use a non-LDAP network when the user is trying to access the network via dial-up connection. While LDAP does provide a good solution to support and authenticate users who are roaming, for those ISPs who are not LDAP enabled, to upgrade to a standard LDAP architecture requires expensive architectural changes that many ISPs are not inclined to make.

Many such non-LDAP ISPs use different subscriber management systems (generally referred to herein as SMS) with differently formatted databases. If a user is roaming and is attempting to connect to as a subscriber from a non-LDAP region, any subscriber management system in the non-LDAP region would need to be kept in synchronization with an authentication database that exists in centralized LDAP database. To date, there is no efficient access to data for authentication purposes from a non-LDAP region to an LDAP region.

What is therefore required is a system and method for allowing users to roam outside of their home regions and to log on to their respective ISPs via dial-up networking whether the home region is LDAP enabled or not.

SUMMARY OF THE INVENTION

It is therefore an objective of the present invention to allow users to roam freely, yet connect to ISPs at different locations and access their home LDAP enabled authentication region.

It is a further objective of the present invention to allow users to connect to non-LDAP based authentication regions and to allow subsequent authentication to take place in an LDAP region.

It is a further objective of the present invention to enable a cable modem or DSL subscriber whose account is assigned to a non-LDAP authenticated site to be able to roam across the country and have access to such services when they are away from their cable modem, i.e., connecting to an ISP where they are located.

It is a further objective of the present invention to allow access to a cable modem or DSL infrastructure using a telephone modem dial-up connection.

It is yet another objective of the present invention to create a regional remote authentication dial-in user service (RADIUS) so that secure authentication can take place.

It is yet another objective of the present invention to create an authentication mechanism so that secure authentication can take place regardless of the format of information in the subscriber management database.

These and other objectives of the present invention will become apparent to those skilled in the art from a review of the specification that follows.

The present invention allows a user to be away from the user's cable modem connection and use a local dial-roaming telephone number, and analog modem, together with client dial-up software to dial into a local Dial Access Provider (DAP). The DAP forwards an access request over a Network Access Server (NAS) over a local Internet network.

That request for access proceeds to a corporate RADIUS server which authenticates the request of the user against an LDAP database. If the user is authenticated against the directory of the LDAP database, access to the cable modem services are allowed.

Operating in this mode, the NAS operates as a client of the corporate RADIUS server. The NAS is responsible for passing user information to the corporate RADIUS server and then acting on the response that is returned.

The corporate RADIUS server receives user connection requests, authenticates the user, and provides configuration information to the NAS to deliver service to the user who is dialing in.

Transactions between the corporate RADIUS server and the NAS are authenticated through unique identification and exchange of secret information relating to identity. This information is not sent in the clear over the network.

The NAS creates an access request containing such attributes as the user name and password. The access request is sent to the corporate RADIUS server for authentication. The RADIUS server then determines to which region the user belongs by comparing the user's region which is, in part a function of a naming convention such as (user name@region.rr.com). This is compared against the region's site type in the configuration file, that is, LDAP or non- LDAP. If the region is an LDAP region, the authentication request is forwarded to the regional LDAP database. The LDAP database then checks its database directory and, if the user is present in the database and password is correct returns an "accept" message or a "deny" message if the user is not in the database.

If the region in which the user is located is not an LDAP based region, the corporate RADIUS server will proxy to an appropriate regional RADIUS server. The regional RADIUS, having received the authentication request in the form of a user name and CHAP hashed password, retrieves the user's clear text password from the subscriber management system (SMS) or account management system (AMS) associated with the non- LDAP region. The system then hashes the clear text password from the SMS/AMS database using the Challenge Handshake Authentication Protocol (CHAP) and compares it to the incoming password which is, in the preferred embodiment, also CHAP hashed and returns an "accept" message if the user is present in the SMS/AMS database or a "deny" message if the user is not present in the database. When the passwords are CHAP hashed as noted above, the presence of the password and comparison to the transmitted password is accomplished by comparing the two hashes. If they exactly mathc, then the suer is poresent in the datbase and an "accept" message is transmitted. If the hashes do NOT match, the a "deny" message is sent. It should be noted that the CHAP hashing is not meant as a limitation. Passwords may be sent "in the clear" although this is not recommended for security reasons, or other hasing algorithms can be use to hash the password that are sent and compared.

It is also within the scope of the present invention to perform the hashing of passwords noted above regardless of the type of region (LDAP/non-LDAP) in which the user and the users access service is located Regardless of the site type, user names and passwords are hashed so as not to be sent in clear text, thereby affording an additional element of security.

When a user completes a dial-in session, the user is disconnected. The NAS server then notifies the corporate RADIUS that the dial-in session has terminated.

The system has the advantage of not requiring major upgrades to non-LDAP regions. For example, for an SMS site, no new hardware would be required since a regional RADIUS will be installed on the existing SMS servers. For AMS sites, an upgrade can be accomplished in a cost effective fashion by using, for example and without limitation, a Compaq Proliant 3000 256 megabytes of RAM and mirrored 5 GB disk drives. Such a system would operate using Windows NT 4.0 and other software generally known in the art.

DETAILED DESCRIPTION OF THE INVENTION

Figure 1:
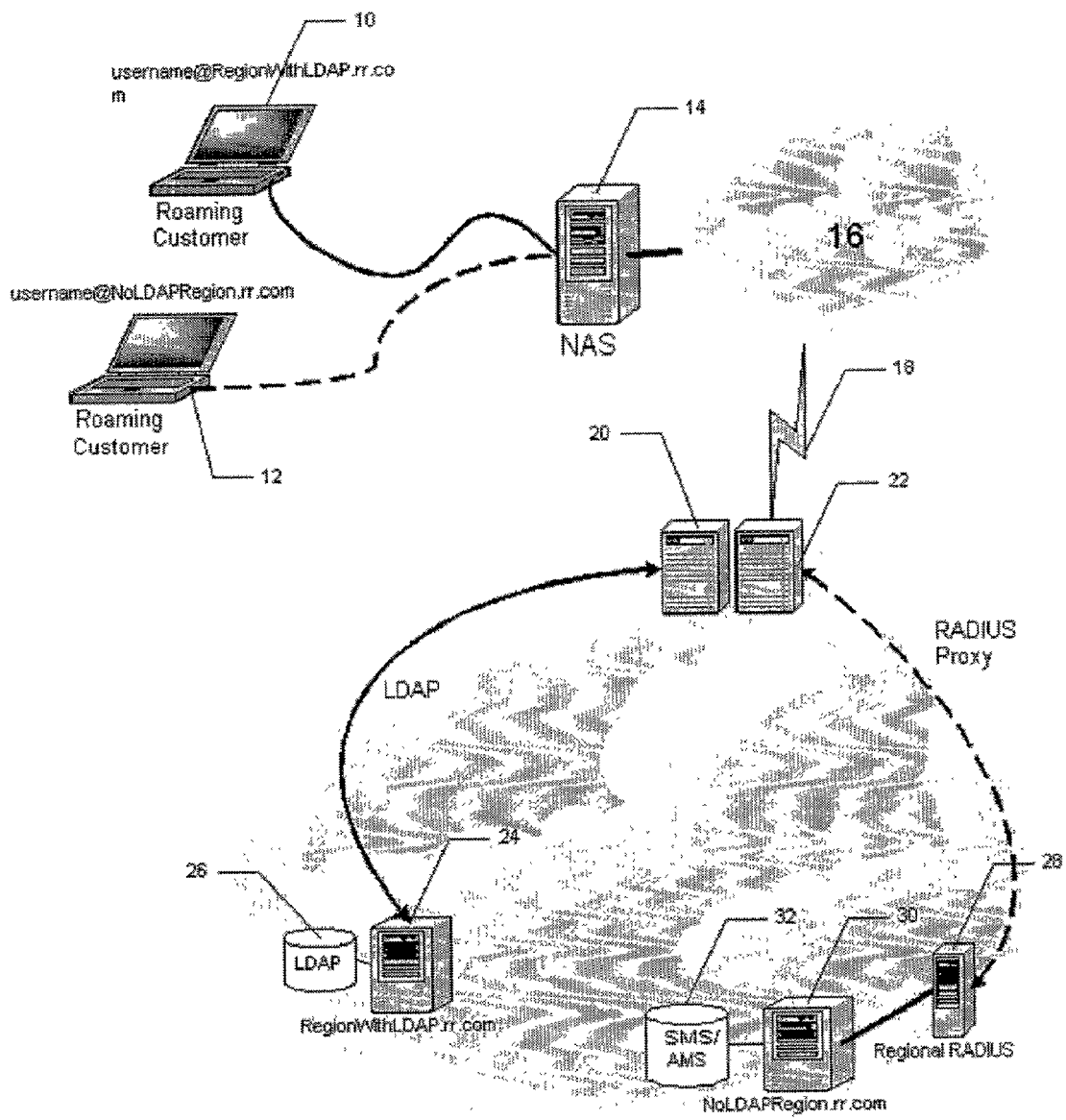
FIG. 1 is an overall architectural view of the present invention.

As noted above, the present invention is a system and method for allowing both LDAP and non-LDAP users to freely roam in different regions of the country and connect to all of the cable or DSL network functionality via dial-up connection.

Users 10 and 12 who are roaming outside of the service region of the cable network provider connect via a dial-up modem connection, or other type of wired or wireless connection to a network access server 14. Naming conventions for users who are roaming allow user 10, for example, who is serviced via an LDAP region to access email and other cable network features by virtue of the email address. Regions with LDAP service and regions without LDAP service are differentiate by virtue of their addresses. The network access server 14 connects to the local Internet Service Provider 16 and, via a dedicated communication line 18, which may, for example, be a T1 line. However, this is not meant as a limitation. Any dedicated high bandwidth line or access both wired and wireless would be suitable for the present invention. The local ISP then connects to the corporate RADIUS server 20 for those users who are in a region that is LDAP enabled. The corporate RADIUS server 20 communicates with the LDAP regional server 24 to determine if the user is in the LDAP database 26. If the user is in the LDAP database 26. The regional LDAP server 24 authenticates the user to the corporate RADIUS server 20 which then sends the appropriate accept or deny signal through the communication link 18 over the local ISP 16 through the network access server 14, to the roaming customer 10.

If the customer is in a non-LDAP region, customer 12 dials in via the network access server 14, over the local ISP 16 and again over dedicated network 18 to the RADIUS server 22. The RADIUS server then proxies the request for access to a regional RADIUS server 28 which connects to the non- LDAP region server 30 which in turn has a subscriber management system (SMS) or account management system (AMS) database 32. Through a view into the non- LDAP region server 30, the system determines if the roaming customer 12 is permitted access. If such access is permitted, a message is sent by the non-LDAP region server 30 to the regional RADIUS 28 to the RADIUS server 22. Thereafter the accept or deny signal is sent via the dedicated network 18 via the local ISP 16 over the network access server 14 to the roaming customer 12.

In this fashion, roaming customers who are in a region which is non- LDAP enabled can still use an access cable or DSL service via a regional RADIUS server which is a relatively inexpensive upgrade to existing systems. Thus, non- LDAP enabled regions do not have to engage in expensive upgrades in order to allow roaming customers to have access to their systems.

A system and method to allow roaming customers to have access to LDAP or non- LDAP enabled regions has now been illustrated. It will be appreciate by those skilled in the art that other variations of the present invention are possible without departing from the scope of the invention as disclosed.

The invention claimed is:

1. A method for dial roaming outside of a home service region comprising:
   dialing into a local dial access provider;
   creating an access request comprising user identifying information and home region identifying information;
   forwarding the access request from a network access server (NAS) to a corporate remote authentication dial-in user service (RADIUS) server;
   determining from the home region identifying information whether the home region supports Lightweight Directory Access Protocol (LDAP) authentication;
   if the home region does not offer LDAP authentication, then:

proxying the access request to a regional RADIUS server associated with the user's home region;
comparing the user identifying information in the access request with user identifying information stored in a regional user database accessible to the regional RADIUS server; and
if the user identifying information in the access request matches the stored user identifying information, then:
authenticating the user; and
providing configuration information to the NAS to allow access to a network of the home region.

2. The method for dial roaming outside of a home service region of claim 1, wherein the NAS functions as a client of the corporate RADIUS server.

3. The method for dial roaming outside of a home service region of claim 1 further comprising:
if the home region offers LDAP authentication, then forwarding the access request to a regional LDAP database.

4. The method for dial roaming outside of a home service region of claim 3 further comprising comparing the user identifying information in the access request with user identifying information stored in a regional user database accessible to the regional LDAP database.

5. The method for dial roaming outside of a home service region of claim 4 further comprising the regional LDAP database sending an "accept" message if the user is in the regional LDAP database and a "deny" message if the user is not in the regional LDAP database.

6. The method for dial roaming outside of a home service region of claim 1, wherein the user identifying information comprises a user name and password.

7. The method for dial roaming outside of a home service region of claim 1, wherein the home region identifying information comprises a component of the user name.

8. The method for dial roaming outside of a home service region of claim 7, wherein the user name compnses an email address of the user.

9. The method for dial roaming outside of a home service region of claim 7, wherein comparing the user identifying information in the access request with user identifying information stored in a regional user database accessible to the regional RADIUS server comprises comparing the user password in the access request with a user password stored in a regional user database accessible to the regional RADIUS server.

10. The method for dial roaming outside of a home service region of claim 9, wherein the user password comprises a first hashed value and wherein comparing the user password in the access request with a user password stored in a regional user database accessible to the regional RADIUS server comprises:
determining at the regional RADIUS server a hashing algorithm used to create the first hashed value;
obtaining the stored password in clear text format;
applying the hashing algorithm to the clear text stored password to produce a second hashed value; and
comparing the first hashed value to the second hash value.

11. The method for dial roaming outside of a home service region of claim 10 wherein the hashing algorithm is CHAP.

12. A system for dial roaming outside of a home Internet service region comprising:
a user computer having a home service region;
a network access server (NAS), wherein the NAS is adapted to:
connect to the user computer via a dial-up connection;
receive user identifying information and home region identifying information from the user computer;
create an access request comprising the user identifying information and the home region identifying information; and
direct the access request to a corporate authentication dial-in user service (RADIUS) server; and
the corporate RADTUS server, wherein the RADRJS server is adapted to:
receive the access request;
determine from the home region identifying information whether the home service region supports Lightweight Directory Access Protocol (LDAP) authentication; and
if the home service region does not offer LDAP authentication, then proxy the access request to a regional RADIUS server associated with the user's home region; and
the regional RADIUS server, wherein the regional RADIUS server is adapted to:
compare the user identifying information in the access request with user identifying information stored in a regional user database accessible to the regional RADIUS server; and
if the user identifying information in the access request matches the stored user identifying information, then authenticate the user and provide configuration information to the NAS to allow the user computer access to a network of the home region.

13. The system of claim 12, wherein the system further comprises a regional LDAP server and a regional LDAP user database accessible to the regional LDAP server, and wherein the corporate RADIUS server is further adapted to:
if the home region offers LDAP authentication, then forward the access request to a regional LDAP server.

14. The system of claim 13, wherein the regional LDAP server if adapted to:
receive the access request; and
compare the user identifying information in the access request with user identifying information stored in the regional LDAP user database.

15. The method of claim 14, wherein the regional LDAP server is further adapted to send an "accept" message if the user is in the regional LDAP user database and a "deny" message if the user is not in the regional user LDAP database.

16. The system of claim 12, wherein the user identifying information comprises a user name and password.

17. The system of claim 16, wherein the NAS is further adapted to hash the user name and password using a hashing algorithm.

18. The system of claim 17, wherein the regional RADIUS server is further adapted to;
determine the hashing algorithm used by the NAS;
apply the hashing algorithm to a name and password stored in the regional database;
and determined if the value of the hash of the user name and password provided in the access request matches the hash value of the name and password stored in the regional database.

19. The system of claim 18, wherein the hashing algorithm is CHAP.

* * * * *